No. 844,888. PATENTED FEB. 19, 1907.
W. A. McCOLLOUGH.
STUBBLE CUTTER.
APPLICATION FILED DEC. 20, 1904.
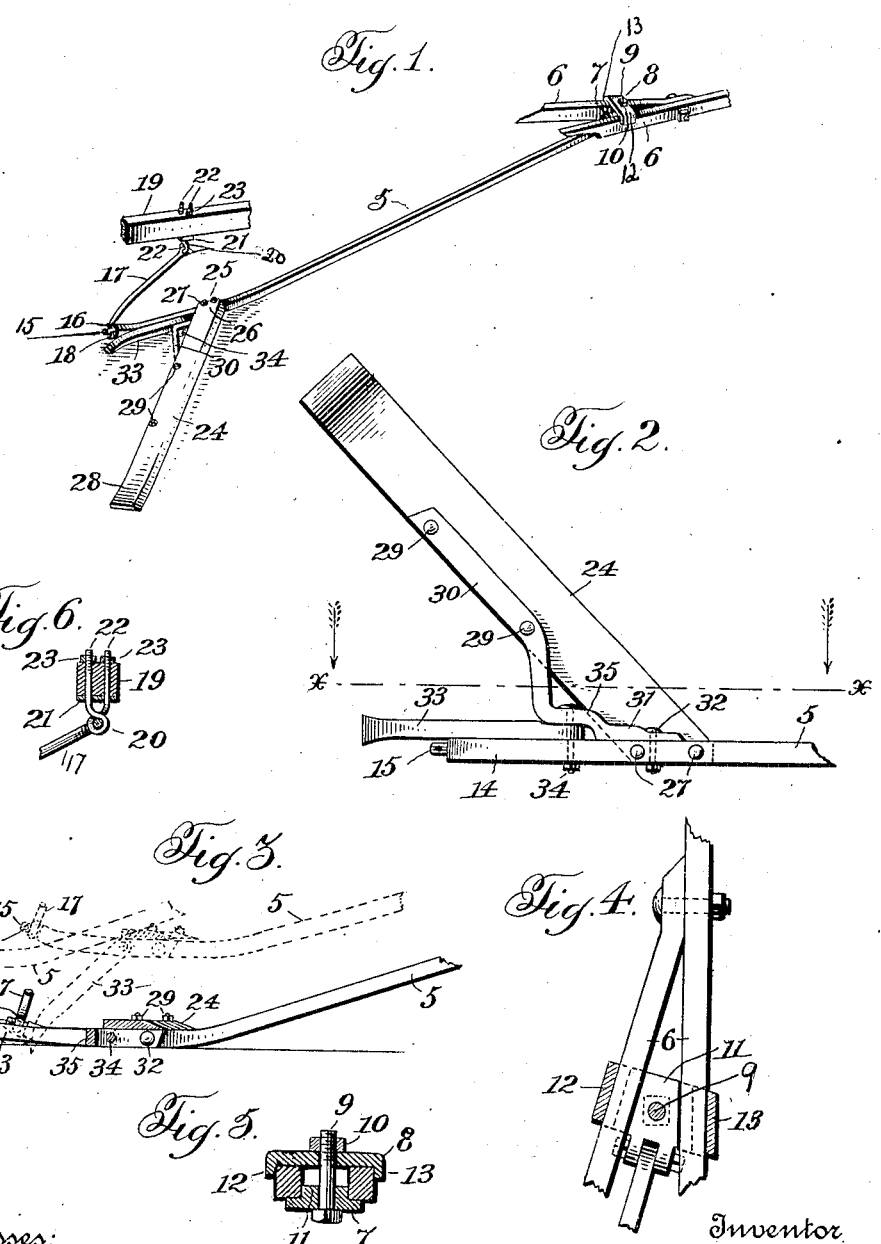
Witnesses:
Jas E. Hutchinson.
A. M. Dow.
Inventor
William A. McCollough,
By Royal E. Burnham, Attorney

UNITED STATES PATENT OFFICE.

WILLIAM A. McCOLLOUGH, OF LAMOILLE, IOWA.

STUBBLE-CUTTER.

No. 844,888.　　　Specification of Letters Patent.　　　Patented Feb. 19, 1907.

Application filed December 20, 1904. Serial No. 237,733.

*To all whom it may concern:*

Be it known that I, WILLIAM A. McCOLLOUGH, a citizen of the United States, residing at Lamoille, in the county of Marshall and State of Iowa, have invented certain new and useful Improvements in Stubble-Cutters, of which the following is a specification, reference being had therein to the accompanying drawings.

This invention relates to improvements in stubble-cutters, and has for its object the provision of a device of this character designed for utilization as an attachment for harvesting-machines, though equally susceptible of application to other implements or vehicles by which the cutter can be drawn from place to place, according to the circumstances attending the particular cutting desired.

The attachment is in general respects somewhat similar to that disclosed in my prior patent, No. 737,650, dated September 1, 1903, the differentiating characteristics of the present implement over that of the patent residing in improved attaching means whereby the device is strengthened and its usefulness correspondingly prolonged, an improved drag-bar or runner and means associated therewith for the attachment of the knife-blade whereby the same is securely secured and braced, and self-acting means for elevating the cutter-blade from the ground and constituting an auxiliary runner therefor when the implement or machine to which it is attached is backed, all of which, as well as other features of the invention, will be apparent from the detail description hereinafter given, when read in connection with the accompanying drawings, forming part hereof, and wherein a convenient embodiment of the invention is illustrated.

In the drawings, in which like reference characters designate corresponding parts in the several views, Figure 1 is a perspective view of the attachment as applied to a harvesting-machine or other carrier, it being necessary to show the latter in a fragmentary manner only. Fig. 2 is a bottom plan of the knife-blade and its immediately-associated parts. Fig. 3 is a section on the line *x x*, Fig. 2, showing the knife elevator and runner in several of its positions, one in full and the others in dotted lines. Figs. 4 and 5 are detail sectional views of the forward coupling, and Fig. 6 is a detail view of the link-supporting means.

Referring more specifically to the drawings, 5 designates a drag-bar and runner, the forward portion of which extends upwardly between and is secured to longitudinally-disposed beams 6 of the vehicle-frame.

The securing means for this part comprise a bottom plate 7 and a top plate 8, perforated centrally for the reception of a clamping-bolt 9, adapted in coöperation with a nut 10 to draw the plates together and cause them to bind upon the beams 6. The bottom plate just referred to has an enlargement or block 11 on its upper surface arranged to project into the space intermediate the beams and contact with the inside faces thereof, the edges of the block being inclined to converge forwardly, whereby when the machine is backed when the implement is in engagement with the ground the resulting effect will be to wedge the blocks more tightly in place rather than tend to loosen the implement at this point of attachment. To perform a similar function, the top plate 8 has a pair of depending flanges 12 13, the former being substantially straight and the latter inclined forwardly and inwardly, whereby the draft on the machine and incidentally on the beams will tend to draw them through the clamping device, and consequently by reason of the inclination just referred to of the flange more effectively wedge or bind the outer depending flanges 12 13 upon the outside edges of the beams.

The rear end of the drag-bar or runner 5 is bent at a slight angle to the forward portion thereof, so that the same may occupy a substantially horizontal plane to contact with the ground and ride thereover, and to prevent penetration and embedding of this contact portion in the ground the same has a rather broad bearing-surface 14.

A pivot stub or pin 15 at the rear end of the bar 5 passes freely through an eye 16 at the lower end of a supporting-link 17, said eye being held upon the pin by a cotter-pin or its equivalent 18. The supporting-link just referred to is substantially straight as compared to the arched link of my former patent and rather than extending upwardly and over the under frame of the vehicle is positioned therebeneath, as shown, whence it is secured to a beam 19 through the medium of loosely-interfitting eyes 20, the former being at the upper end of the link and the latter suspended from the beam 19 through the medium of a spacing-bar or wear-plate 21, through which and through apertures in said beam 19 separated arms 22 of said eye pass, the same being fastened in place by suitable nuts 23. By this arrangement greater play is allowed the link and drag-bar to overcome undue obstacles in the path of travel of the cutter.

The cutting blade or knife is represented at 24, and to position the same at a proper angle to obtain a shearing cut in the operation thereof the inner edge inclines relative to the cutting edge and back of the blade, as at 25, and this inner edge 26 rests upon the flat upper edge of the drag-bar 5 and is secured thereto by nuts and bolts 27. It has been customary in cutting implements of various types to round off or curve the back of the blade to the cutting edge of the same at the free end thereof; but such blades are objectionable, because owing to the reduction of metal they are weakened at their ends and always present a sharp point, and the same frequently digs into the surface of the ground, and consequently impedes the easy operation of the device. My present blade differs from this older type in that the free end thereof is curved upwardly slightly, as at 28, which will prevent contact of its point with the ground, as well as permit the use of a blade of substantially uniform width throughout.

It is to be noted that there are two of the bolts 27 which secure the inner edge of the cutter-blade to the drag-bar, and also that the back edge of the blade is bolted at separated points 29 to a laterally-extending rearwardly-inclining bracket or arm 30, having a forward portion 31, running parallel with the rear side of the drag-bar, to which latter said portion is bolted at 32. By this arrangement the blade is mounted very firmly in place, the same has a back brace, and the proper inclination of the blade rearwardly of the line of travel of the machine is obtained.

Another important feature of the invention is the provision of a pivoted elevator and runner 33 for the cutter-blade, said elevator being in the nature of a freely-swinging arm pivoted at 34 on the rearward bolt 32 between the drag-bar and an offset intermediate portion 35 of the bracket 30. The free end of this arm 33 is pointed and bent downwardly to ride over the surface of the ground during the forward movement of the machine, but to dig into and resist backward travel of the device on the ground when the movement of the machine is reversed, said point acting as a fixed pivot in this latter instance, whereby the arm, and consequently the cutter-blade, are elevated and swung over, as clearly indicated in Fig. 3 of the drawings, thus throwing said cutter out of operation so long as the machine is backing. As the machine continues to back the arm serves as a support and runner for the blade. (See lower dotted-line position thereof.) It is obvious that immediately upon resumption of forward travel of the machine the elevator and runner 33 will fall back to its initial position and again lower the cutter-blade into operative relation to the ground.

Of course while the elevator and runner above defined are peculiarly adapted to stubble-cutters and have been primarily designed for that purpose, it will be apparent that the same can be employed for automatically raising and lowering implements of other types.

It is to be understood that changes and alterations can be made in the structure herein disclosed without departing from the nature and spirit of the invention.

Having thus described my invention, what I claim as new, and desire to secure by Letters Patent, is—

1. In a stubble-cutter attachment, the combination with a transportable frame, of a knife-carrying frame loosely attached thereto, and means for automatically raising the knife-carrying frame upon a movement of said transportable frame in other than a forward direction.

2. In a stubble-cutter attachment for harvesters, the combination with a transportable frame, of a knife-carrying frame loosely attached to said transportable frame, and a leg jointedly attached to the rear of the knife-carrying frame and resting upon the ground adapted to raise the knife-carrying frame upon a movement of said transportable frame in other than a forward direction.

3. In a stubble-cutter attachment, the combination with a transportable frame, of a knife-carrying frame movably attached thereto, instrumentalities for raising the knife-carrying frame above the ground as the machine moves rearward and enabling automatic returning of the knife-carrying frame into operative position as the machine moves forward.

4. In combination, a frame, a drag-bar movably connected therewith, a cutter-blade, an elevator, and instrumentalities for securing the cutter-blade to the drag-bar and for pivotally mounting the elevator whereby the latter will be operable to automatically raise the drag-bar and cutter-blade upon movement thereof in a predetermined direction.

5. In combination with a drag-bar, a cutter-blade secured thereto, a reinforcing back support for said cutter-blade having a portion attached to the drag-bar and an offset portion part of which is parallel with the drag-bar and part of which is connected with the cutter-blade, and an elevator-arm pivoted between said parallel part of the offset portion and the drag-bar.

6. In a stubble-cutter, the combination with a transportable frame, of a cutter operatively associated therewith, and means for automatically raising said cutter upon every movement of said transportable frame tending rearwardly from the direction of forward travel thereof.

In testimony whereof I affix my signature in presence of two witnesses.

WILLIAM A. McCOLLOUGH.

Witnesses:
    JNO. P. WOODBEGH,
    C. A. NEWCOMER.